United States Patent
Lee et al.

(10) Patent No.: US 7,907,329 B2
(45) Date of Patent: Mar. 15, 2011

(54) ELECTROPHORETIC DISPLAY DEVICE AND MANUFACTURING METHOD THEREOF

(75) Inventors: Jea Gu Lee, Gumi-si (KR); Jae Soo Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/654,378

(22) Filed: Dec. 17, 2009

(65) Prior Publication Data

US 2010/0157412 A1 Jun. 24, 2010

(30) Foreign Application Priority Data

Dec. 23, 2008 (KR) ................. 10-2008-0132730

(51) Int. Cl.
*G02B 26/00* (2006.01)
*G09G 3/34* (2006.01)
*G03G 17/04* (2006.01)
(52) U.S. Cl. ................. 359/296; 345/107; 430/38
(58) Field of Classification Search .......... 359/296; 345/105, 107; 430/31–32, 34, 38; 204/450, 204/600; 250/208.1
See application file for complete search history.

(56) References Cited

U.S. PATENT DOCUMENTS

| 2004/0027327 A1* | 2/2004 | LeCain et al. ........... 345/107 |
| 2009/0109520 A1* | 4/2009 | Park et al. ............... 359/296 |
| 2010/0264817 A1* | 10/2010 | Bouten et al. ........... 313/512 |

* cited by examiner

*Primary Examiner* — Ricky L Mack
*Assistant Examiner* — Dawayne A Pinkney
(74) *Attorney, Agent, or Firm* — McKenna Long & Aldridge LLP

(57) ABSTRACT

An electrophoretic display (EPD) device adapted to prevent a dispensed fluid sealant from moving toward a non-active area is disclosed. The EPD device includes: a first substrate configured to include a flexible plate divided into an active area and a non-active area; a thin film transistor array formed on the active area of the plate; a second substrate opposite to the first substrate; an electrophoretic film, between the first and second substrates, configured to contain charged particles driven depending on electrophoresis; a sealant, between the first and second substrates, hardened from fluid state; a sealant block formed on a sealant formation region to prevent the fluid sealant from flowing into the non-active area before hardening of the fluid sealant, wherein the sealant block is configured to include a first dam, a second dam, and a furrow between the first and second dams.

19 Claims, 5 Drawing Sheets

ELECTROPHORETIC DISPLAY DEVICE AND MANUFACTURING METHOD THEREOF

CROSS-REFERENCE TO RELATED APPLICATION

This application claims priority to Korean Patent Application No. 10-2008-132730, filed on Dec. 23, 2008, which is hereby incorporated by reference in its entirety.

BACKGROUND

1. Field of the Invention

This present invention relates to an electrophoretic display (EPD) device and a manufacturing method thereof, and more particularly to an electrophoretic display device adapted to prevent sealant from moving onto a non-active area, as well as a manufacturing method thereof.

2. Description of the Related Art

In general, electrophoretic display (EPD) devices are reflection type display devices which can repeatedly write and erase images and letters using electrophoresis. In other words, the EPDs allow charged particles scattered in a fluid substance to move according to an applied electric field, in order to display images or letters.

EPDs can be manufactured to be light weight and thin as well as to normally maintain display properties in a bent-state like paper. In addition, EPDs provide superior visual-perceptibility and portability compared to paper. In view of these points, EPDs have been highlighted as medium for paper substitution showing a yearly increment, and furthermore have been actively developed as flexible display devices.

FIG. 1A is a cross-sectional view showing an EPD according to the related art. Referring to FIG. 1A, a related art EPD includes a lower substrate 10 with a lower electrode (not shown), an upper substrate 12 with an upper electrode (not shown), and an electrophoretic film 14 interposed between the lower and upper substrates 10 and 12. The electrophoretic film 14 includes electrophoretic suspension particles driven by a vertical electric field induced between the lower and upper electrodes. The lower and upper substrates 10 and 12 may be a flexible plate type of base substrate.

The EPD further includes a sealant 16 interposed between the lower and upper substrates 10 and 12. The sealant 16 is formed to prevent moisture from intruding into the EPD. The sealant 16 is formed through a process of dispensing a fluid sealant on the lower substrate 10 using a dispenser 18 shown in FIG. 1B, and allowing the fluid sealant 16a to flow along a direction D1 by a tensile force between the electrophoretic film 14 and the upper substrate 12.

However, the fluid sealant 16a dispensed on the flexible lower substrate 10 can flow not only along the positive direction D1, but also along a negative direction D2. The fluid sealant 16a flowing along the negative direction D2 can reach a different area, such as a non-active area including a driver circuit loading region, beyond the sealant formation area. In this case, the fluid sealant 16a causes malfunction or breakdown for the driver circuit to be formed or installed on the driver circuit loading region.

To address the driver circuit malfunction or breakdown, a method of shifting the driver circuit toward the edge of the panel has been proposed. The shift of the driver circuit forces the panel to be enlarged. As the sealant is formed on an unnecessary area, the amount of the sealant also increases.

SUMMARY OF THE INVENTION

Accordingly, the present embodiments are directed to an EPD that substantially obviates one or more problems due to the limitations and disadvantages of the related art, as well as a manufacturing method thereof.

An advantage of the embodiments is to provide an EPD that can prevent a dispensed fluid sealant from moving toward a non-active area, as well as a manufacturing method thereof.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an EPD includes: a first substrate configured to include a flexible plate divided into an active area and a non-active area; a thin film transistor array formed on the active area of the plate; a second substrate opposite to the first substrate; an electrophoretic film, between the first and second substrates, configured to contain charged particles driven depending on electrophoresis; a sealant, between the first and second substrates, hardened from fluid state; a sealant block formed on a sealant formation region to prevent the fluid sealant from flowing into the non-active area before hardening of the fluid sealant, wherein the sealant block is configured to include a first dam, a second dam, and a furrow between the first and second dams.

The sealant formation region is provided in the boundary portion between the active and non-active areas and the fluid sealant is dispensed on the sealant formation region adjacent to the active area.

The sealant block is formed on the sealant formation region adjacent to the non-active area.

An EPD manufacturing method according to another aspect of the present embodiment includes: preparing an lower plate divided into an active area and a non-active area; forming a gate electrode and a gate line on the active area of the lower plate; forming a gate insulation film on the entire surface of the lower plate including a sealant formation region and the active area; forming a semiconductor pattern and source/drain electrodes on the gate insulation film; forming a passivation film on the lower plate with the source/drain electrodes and patterning the passivation film, to provide a contact hole exposing the drain electrode; and forming a pixel electrode electrically connected to the drain electrode, wherein the passivation film is also formed on the sealant formation region, and the passivation film and the gate insulation film on the sealant formation region are patterned to provide first and second dams and a furrow during the patterning of the passivation film.

The first and second dams are provided on regions in which the passivation film and the gate insulation film remain after the patterning of the passivation film and the gate insulation film, and the furrow is provided on a region in which the passivation film and the gate insulation film are removed after the patterning of the passivation film and the gate insulation film.

The first and second dams are formed in a stacked layer of the gate insulation film and the passivation film.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1A:
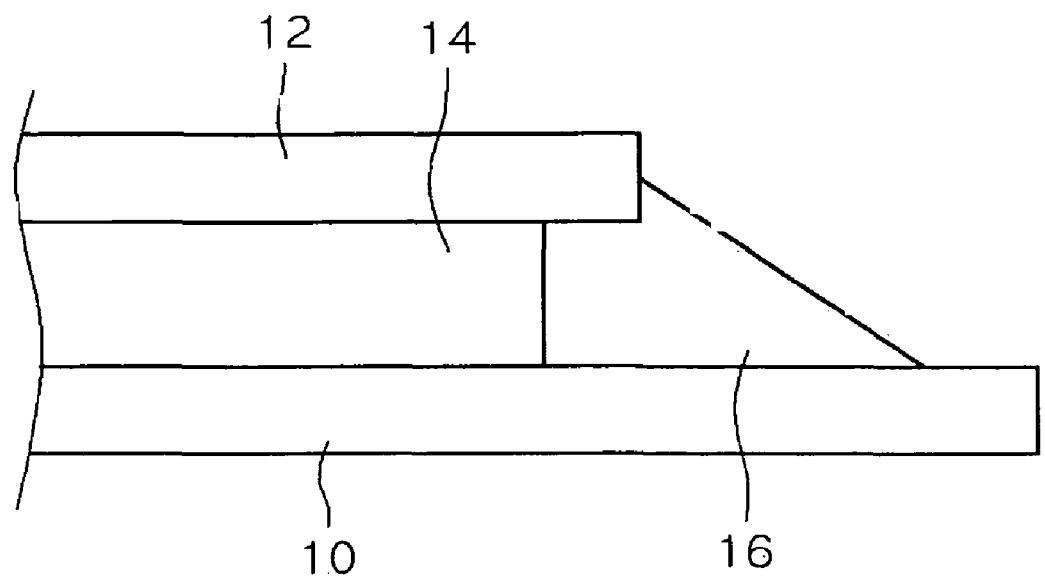
FIGS. 1A and 1B are cross-sectional views showing an EPD according to the related art.
Figure 1B:
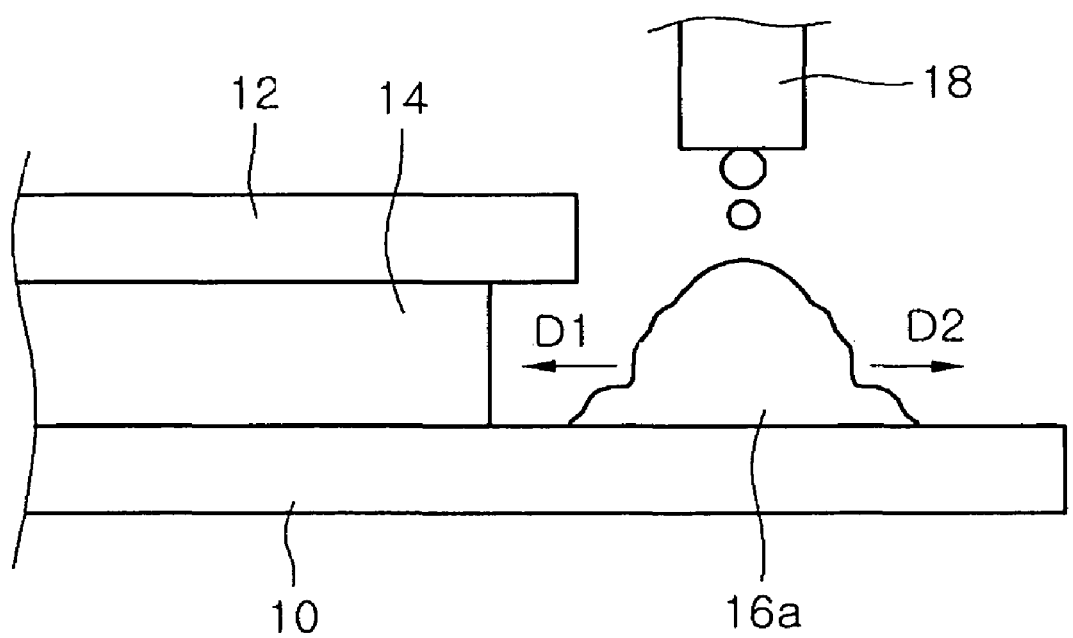

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

An EPD and a manufacturing method thereof according to an embodiment of the present disclosure will now be explained in detail referring to the attached drawings.

Figure 2A:
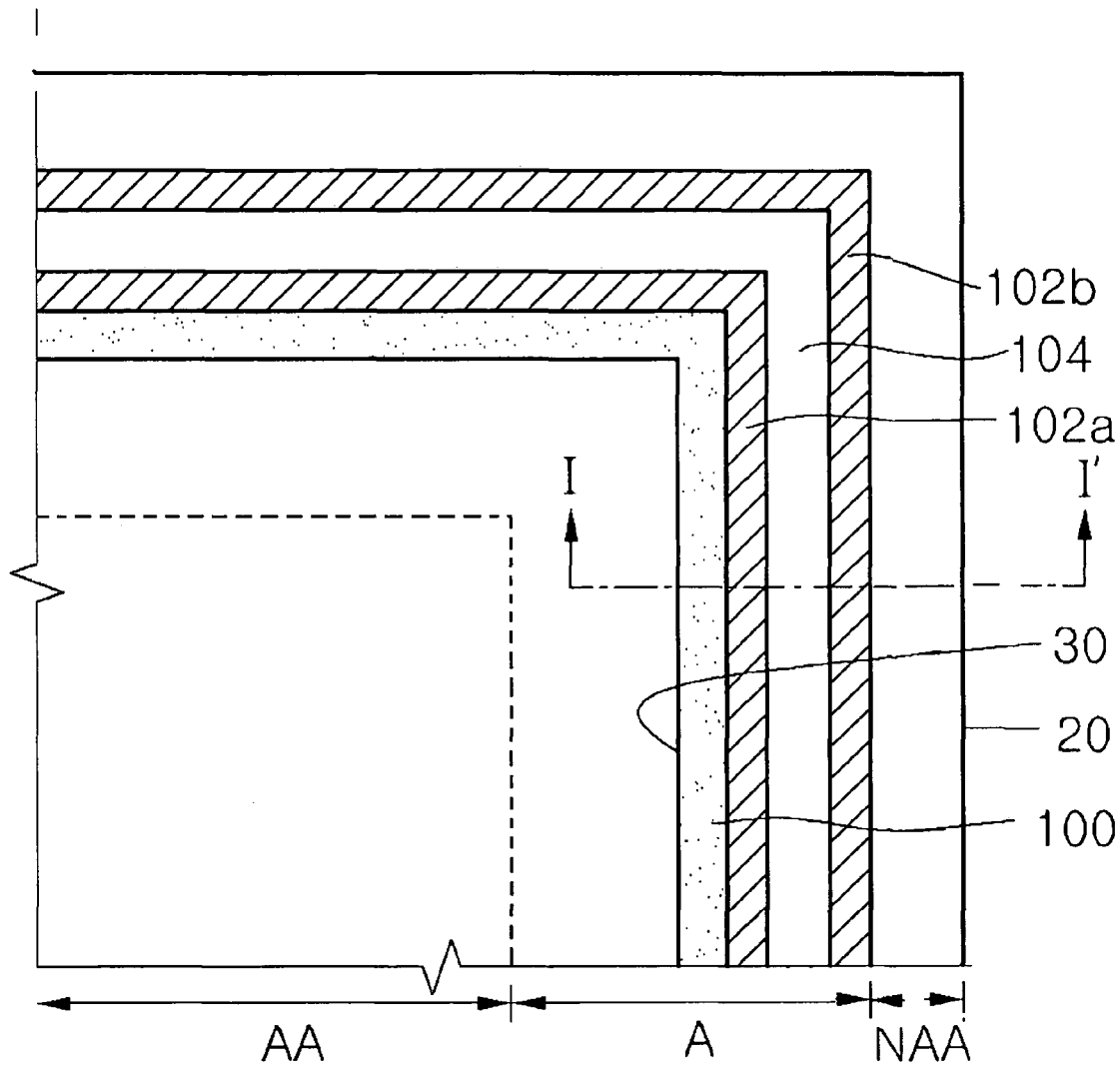
FIG. 2A is a planar view showing an EPD according to an embodiment of the present disclosure.
Figure 2B:
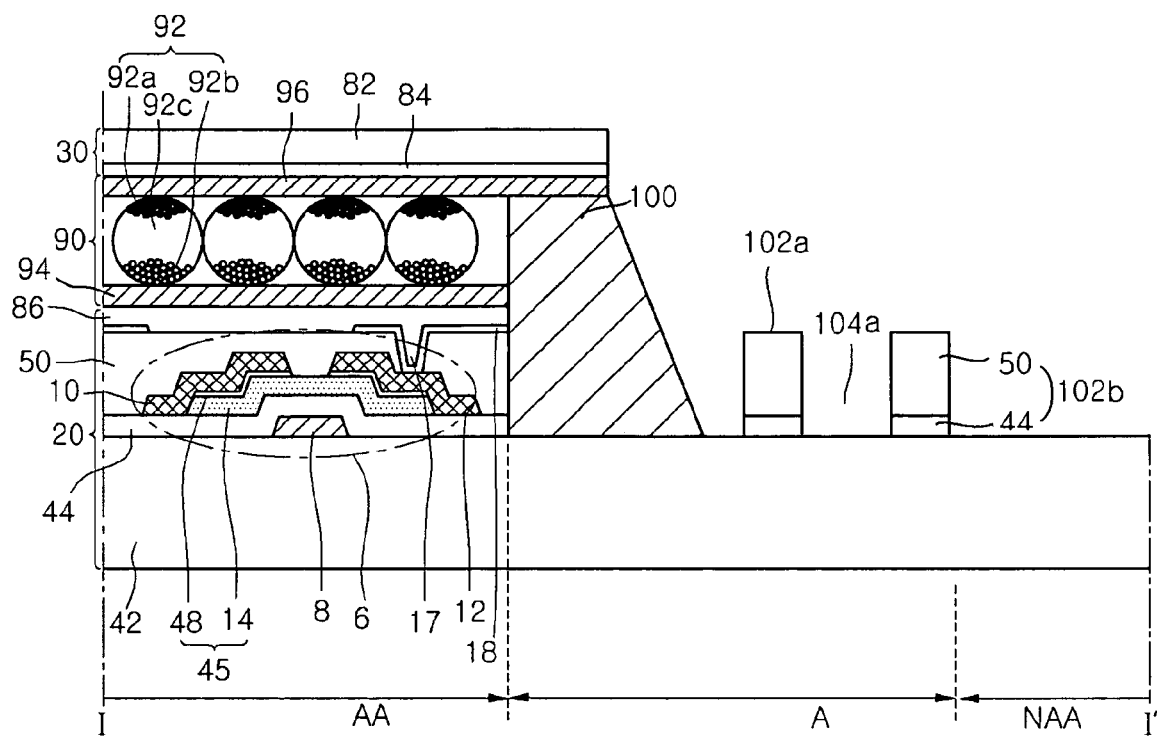
FIG. 2B is a cross-sectional view showing an EPD according to an embodiment of the present disclosure taken along the line I-I' shown in FIG. 2A.
Figure 2C:
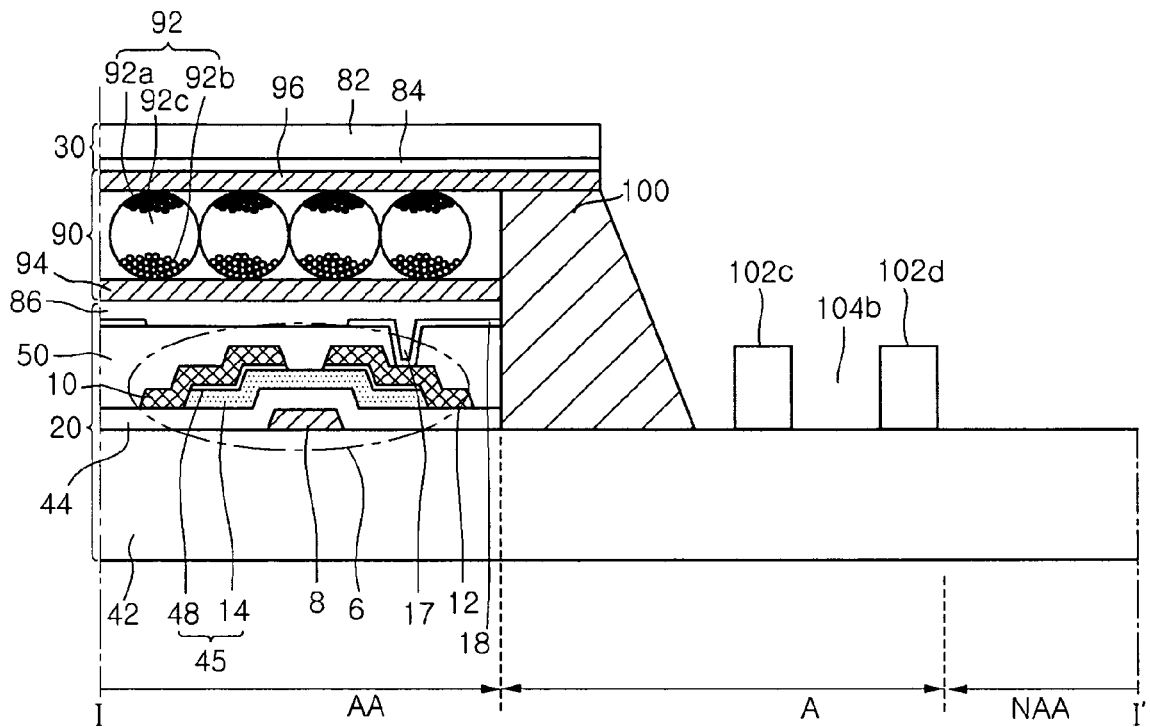
FIG. 2C is a cross-sectional view showing an EPD according to another embodiment of the present disclosure taken along the line I-I' shown in FIG. 2A.

FIG. 2A is a planar view showing an EPD according to an embodiment of the present disclosure. FIG. 2B is a cross-sectional view showing an EPD according to an embodiment of the present disclosure taken along the line I-I' shown in FIG. 2A. FIG. 2C is a cross-sectional view showing an EPD according to another embodiment of the present disclosure taken along the line I-I' shown in FIG. 2A. Referring to FIGS. 2A and 2B, an EPD of the present embodiment includes a lower substrate 20, an upper substrate 30, and an electrophoretic film 90 interposed between the substrates 20 and 30. The EPD is divided into an active area AA corresponding to part of the lower substrate 20 which overlaps the electrophoretic film 90, and a non-active area NAA including the rest of the lower substrate 20, except for a sealant formation region A.

The upper substrate 30 includes a common electrode 84 formed on an upper plate 82. The upper plate 82 may be formed of a flexible material, such as a flexible plastic, an easily bendable base film, a flexible metal, and so on.

The electrophoretic film 90 is configured to include a plurality of capsules 92 each containing charged pigment particles, a lower protective layer 94 disposed under the capsules 92, and an upper protective layer 96 on the capsules 92. Each of the capsules 92 is configured to contain black pigment particles 92a reacting to a positive polarity voltage, white pigment particles 92b reacting to a negative polarity voltage, and solvent. The lower and upper protective layers 94 and 96 protect the capsules 92 and prevent them from moving. Such lower and upper protective layers 94 and 96 may be formed of either a flexible plastic, an easily bendable base film, or another similar material.

The lower substrate 20 includes gate and data lines (not shown) formed crossing each other in the center of a gate insulation film 44 on the active area of a lower plate 42, a thin film transistor (TFT) 6 formed at an intersection of the gate and data lines, and a pixel electrode 18 formed on each pixel region which is defined by the crossing gate and data lines. The lower plate 42 may be formed of a flexible material, such as a flexible plastic, an easily bendable base film, a flexible metal, and the like.

The TFT 6 includes a gate electrode 8 receiving a gate voltage, a source electrode 10 connected the data line, a drain electrode 12 connected to the pixel electrode 18, and an active layer overlapping the gate electrode 8 and forming a channel between the source and drain electrodes 10 and 12. The active layer 14 is formed partially overlapping the source electrode 10 and the drain electrode 12 in order to form the channel. The TFT 6 further includes an ohmic contact layer 48 formed on the active layer 14. The ohmic contact layer 48 comes in ohmic contact with the source electrode 10 and the drain electrode 12. The ohmic contact layer 48 together with the active layer 14 may configure a semiconductor pattern 45.

The pixel electrode 18 electrically contacts the drain electrode 12 through a contact hole 17. The contact hole 17 penetrates through a passivation (or protective) film 50 and exposes the drain electrode 12. The passivation film 50 protects the TFT 6.

The lower substrate 20 formed in such a structure is combined with the electrophoretic film 90 by an adhesive.

The EPD further includes a sealant 100 interposed between the lower and upper substrates 20 and 30, and a sealant block disposed on the sealant formation region, i.e., at the boundary portion between the active and non-active areas AA and NAA. The sealant 100 prevents moisture from intruding into the inside of the EPD. The sealant block controls the flowing of the sealant 100 during the sealant formation process.

Figure 3:
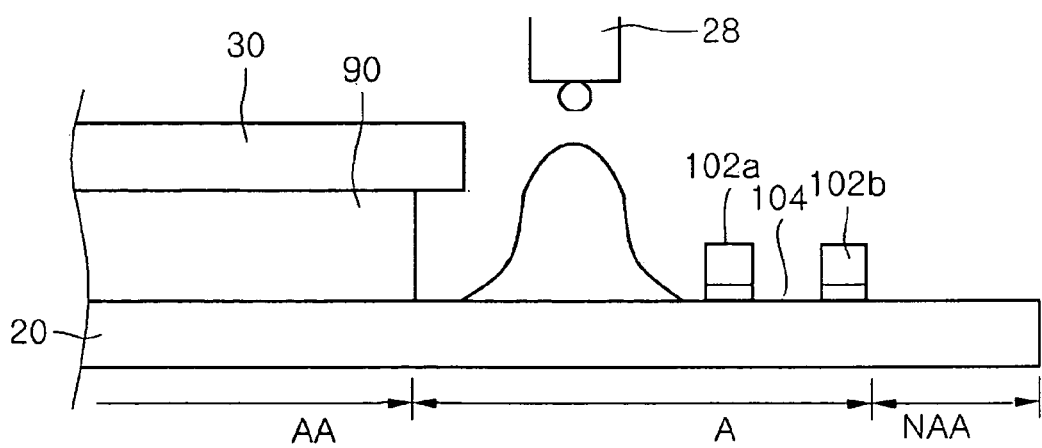
FIG. 3 is a cross-sectional view showing the state of a fluid sealant dispensed on an EPD according to an embodiment of the present disclosure.

The sealant 100 is formed through a dispensing process of dispensing a fluid sealant 100a at a designated location on the sealant formation region A of the lower substrate 20 using a dispenser 28 shown in FIG. 3, and a hardening process of curing the fluid sealant 100a. The designated location on the sealant formation region A is designed to come more close to the active area AA, while the sealant block controlling the flowing of the fluid sealant 100a is formed closely to the non-active area NAA.

More specifically, the fluid sealant 100 prior to hardening can flow not only toward the active area AA but also toward the non-active area NAA due to the bending property of the lower plate 42 which is included in the lower substrate 20. In order to prevent the fluid sealant 100a from flowing into the non-active area NAA, the sealant block is formed on the sealant formation region A close to the boundary portion of the non-active area NAA. Such a sealant block includes a first dam 102a, a furrow 104, and a second dam 102b which can be arranged in order as shown in FIG. 3.

To prevent the fluid sealant 100a from flowing into the non-active area NAA by the sealant block will now be explained in detail.

Figure 4A:
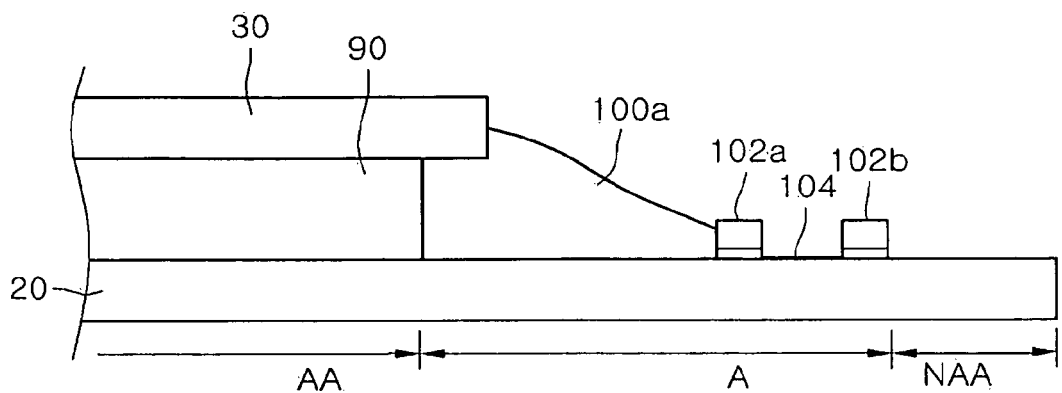
FIGS. 4A to 4C are cross-sectional views showing the flowing state of a fluid sealant included in an EPD according to an embodiment of the present disclosure.
Figure 4B:
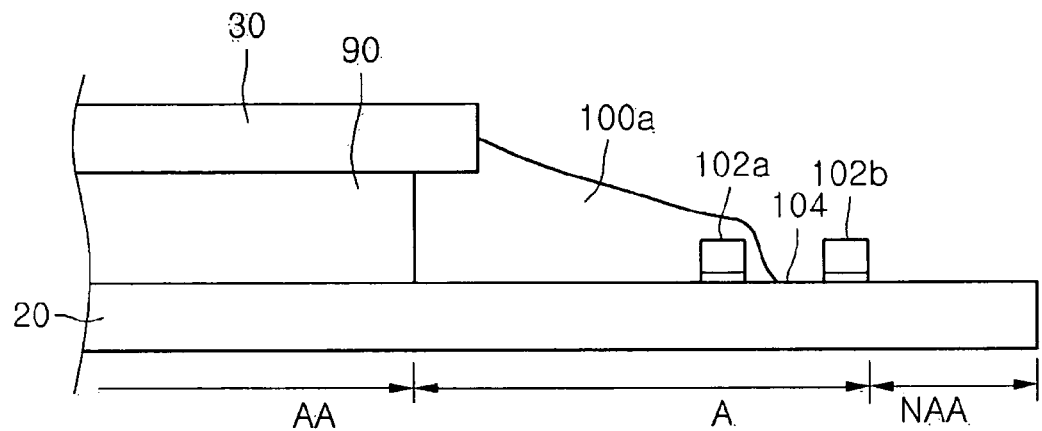
Figure 4C:
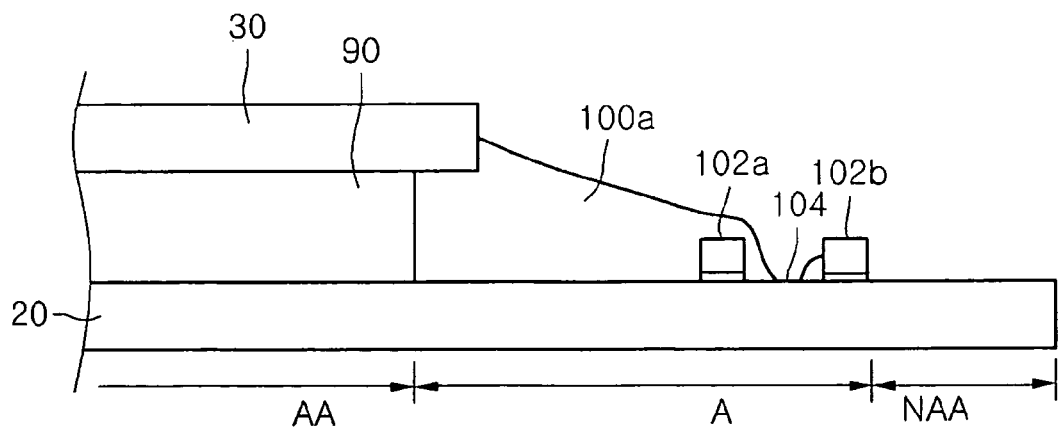

The fluid sealant 100a dispensed on the lower substrate 20 shown in FIG. 3 flows toward the active area AA and the non-active area NAA, as shown in FIGS. 4A to 4C. The fluid sealant 100a moving toward the active area AA fills an opening surrounded by the lower substrate 20, the upper substrate 30, and the electrophoretic film 90.

Meanwhile, the fluid sealant 100a moving toward the non-active area NAA is primarily prevented from flowing into the furrow 104 due to tensile force generated on one edge of the first dam 102a, as shown in FIG. 4A. The fluid sealant 100a overflowing into the non-active area without being prevented by the first dam 102a is secondarily blocked from moving toward the second dam 102b due to tensile force generated in the other edge of the first dam 102a, as shown in FIG. 4B. Furthermore, the fluid sealant 100a moving toward the non-active area NAA despite the first dam 102a and the furrow 104 is thirdly blocked from flowing into the non-active area NAA due to tensile force generated on one edge of the second dam 102b, as shown in FIG. 4C. As such, the fluid sealant 100a is substantially prevented from flowing into the non-active area NAA by means of the first and second dams 102a and 102b and the furrow 104 formed on the sealant formation region A during the sealant formation process.

The first and second dams 102a and 102b and the furrow 104 prevent not only the fluid sealant 100a from moving toward the non-active area NAA, but also moisture from intruding into the active area AA. This results from the fact that the intrusion path of moisture into the active area AA passing the second dam 102b, the furrow 104, and the first dam 102a is longer than that of moisture intruding into the active area AA without passing the first and second dams 102a and 102b and the furrow 104. In other words, the greater the length of the intrusion path of moisture, the more the intrusion probability of moisture is lowered, because external moisture can evaporate during intrusion. Accordingly, the first dam 102a, the furrow 140, and the second dam 102b can greatly prevent external moisture from intruding into the active area AA in comparison with a device without such barriers.

Method of manufacturing the lower and upper substrates 20 and 30 of the EPD in which such dams and furrow are formed will now be explained. The method will be described referring to FIGS. 2B and 2C below. FIG. 2B illustrates a lower substrate on which a double film dam is formed according to an embodiment of the present disclosure. FIG. 2C illustrates a lower substrate on which a single film dam is formed according to another embodiment of the present disclosure.

Firstly, a lower substrate 20 includes a gate electrode 8 and a gate line (not shown) which are provided by forming and patterning a metal film for the gate electrode and the gate line on a lower plate 42, as shown in FIGS. 2B and 2C. A gate insulation film 44 is formed on the entire surface of the lower plate 42 including the gate electrode 8 and the gate line. The gate insulation film 44 is formed of an insulation material such as silicon nitride. At this time, the gate insulation film 44 is formed not only on an active area AA, but also on a sealant formation region A, as shown in FIG. 2B. Alternatively, the gate insulation film 44 can be formed on only the active area AA without the sealant formation region A, as shown in FIG. 2C.

On the lower plate 42 with the gate insulation film 44, a semiconductor layer pattern 45 including a stacked active layer 14 and ohmic contact layer 48, source/drain electrodes 10 and 12, and a data line (not shown) is provided by forming and patterning an amorphous silicon film, an amorphous dopant-silicon film, and a metal film for a data line on the lower plate 42. In this case, the formation of the semiconductor layer pattern 45 and the source/drain electrodes can be completed either by forming and patterning the metal film after patterning of the amorphous silicon/dopant-silicon films, or by a unified process of patterning the amorphous silicon/dopant-silicon films and the metal film all at once.

Sequentially, a passivation (or protective) film 50 is formed on the lower plate 42 including the source/drain electrodes 10 and 12 and the data line. The passivation film 50 is patterned to form a contact hole 17 which exposes the drain electrode 12. Such a passivation film 50 is formed of an organic insulation material including a material such as photoacryl or BCB.

In addition, when the passivation film 50 is formed on the active area AA, it is simultaneously formed on the sealant formation region A, as shown in FIG. 2B. In this case, the passivation film 50 on the sealant formation region A is formed on the gate insulation film 44. Alternatively, the passivation film 50 can be formed directly on the substrate 42 corresponding to the sealant formation region A, as shown in FIG. 2C. In other words, the gate insulation film 44 does not exist under the passivation film 50 on the sealant formation region A.

The passivation film 50 and the gate insulation film 44 on the sealant formation region A shown in FIG. 2B are patterned all at once when the contact hole 17 is formed by patterning the passivation film 50 on the active area AA, thereby forming first and second dams 102a and 102b and a first furrow 104a. After the patterning process of the passivation film 50, the remaining double-film (or stacked layer) patterns consisting of the gate insulation film 44 and passivation film 50 become the first and second dams 102a and 102b. A region between the double-film patterns, in which the passivation and gate insulation films 44 and 50 do not remain, becomes the first furrow 104a. The height of the first and second dams 102a and 102b corresponds to the total height of the gate insulation film 44 and the passivation film 50, because they are formed by patterning the stacked gate insulation film 44 and passivation film 50.

On the other hand, the passivation film 50 on the sealant formation region A shown in FIG. 2C are patterned when the contact hole 17 is formed by patterning the passivation film 50 on the active area AA, thereby forming third and fourth dams 102c and 102d and a second furrow 104b. In other words, after the patterning process of the passivation film 50, the remaining single-film patterns consisting of the passivation film 50 become the third and fourth dams 102c and 102d. A region between the single-film patterns, in which the passivation film does not remain, becomes the second furrow 104b. The height of the third and fourth dams 102c and 102d corresponds to the height of the passivation film 50, because they are formed by patterning the passivation film 50.

Next, a pixel electrode 18 is provided by forming and patterning a transparent conductive film on the lower plate 42 including the contact hole 17. The pixel electrode 18 is electrically connected to the drain electrode 12 via the contact hole 17.

In these ways, the dams can be formed to include either a double-film consisting of the gate insulation film 44 and the passivation film 50 stacked as shown in FIG. 2B, or a single-film having only the passivation film 50 as shown in FIG. 2C. Although it is explained the structure that the dams are formed of the gate insulation film and/or the passivation film, the EPD of the present embodiment is not limited to these. In other words, any films formed on the active area AA can be used in the formation of the dams, instead of the gate insulation film and/or the passivation film.

A method of manufacturing an upper substrate of the EPD and an electrophoretic film combined with the upper substrate will now be explained referring to FIG. 2A.

An upper substrate 30 includes a common electrode 84 below an upper plate 82. The common electrode 84 is provided by forming a transparent conductive film below the upper plate 82. The common electrode 84 of the upper plate 82 is bonded with an electrophoretic film 90.

The electrophoretic film 90 is provided by positioning a lower protective layer 94 and an upper protective layer 96 under and on a plurality of capsules 92. Each of the capsules 92 contains charged pigment particles.

In this way, although the sealant block is implemented in the arrangement of the first dam 102a, the furrow 104, and the second dam 102b, the EPD of the present embodiment is not limited to this. The sealant block may consist of more than two dams, together with furrows between every two dams. For example, an EPD of the present embodiment can include a sealant block having another arrangement in which the first dam 102a, the furrow 104, and the second dam 102b are repeated at least twice.

As described above, the EPD and the manufacturing method thereof form the sealant block on the sealant formation region and prevent the dispensed fluid sealant on the lower plate from flowing into the non-active area. As such, the fluid sealant is not formed on an undesired region (or area) so that process efficiency is improved. Also, since the fluid sealant does not flow into the driver circuit loading region, a defect and/or malfunction in the driver circuit to be formed or installed in the following process can be substantially prevented. Furthermore, it is unnecessary to shift the driver circuit toward the edge of the panel, and thus the size increment of the panel can be avoided. In addition, external moisture intruding into the active area can be more effectively blocked as well.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. An electrophoretic display device comprising:
   a first substrate including an active area, a sealant formation region and a non-active area;
   a thin film transistor array formed in the active area;
   a second substrate opposite to the first substrate;
   an electrophoretic film between the first and second substrates;
   a sealant formed in the sealant formation region;
   a sealant block formed in the sealant formation region, wherein the sealant block includes at least two dams and at least one furrow therebetween.

2. The electrophoretic display device according to claim 1, wherein the sealant formation region is provided in the boundary portion between the active and non-active areas.

3. The electrophoretic display device according to claim 1, wherein the sealant before being hardened is dispensed in a part of the sealant formation region adjacent to the active area.

4. The electrophoretic display device according to claim 1, wherein the sealant block is formed in a part of the sealant formation region adjacent to the non-active area.

5. The electrophoretic display device according to claim 1, wherein the first and second substrates each includes a flexible material.

6. The electrophoretic display device according to claim 1, wherein the first substrate further includes a gate insulation film and a passivation film and wherein the dams are formed of the same materials of the gate insulation film and the passivation film.

7. A method of manufacturing an electrophoretic display device, the method comprising:
   preparing a first substrate including an active area, a sealant formation region and a non-active area, and a second substrate;
   forming a gate electrode and a gate line in the active area of the first substrate;
   forming a gate insulation film on a part of the first substrate including the active area;
   forming a semiconductor pattern and source/drain electrodes on the gate insulation film;
   forming a passivation film on a part of the first substrate including the active area and the sealant formation region;
   forming a pixel electrode connected to the drain electrode, forming an electrophoretic film between the first and second substrates; and
   dispensing a sealant in the sealant formation region;
   wherein the passivation film in the sealant formation region is patterned to provide at least two dams and at least one furrow therebetween.

8. The method according to claim 7, wherein the formation of the gate insulation film includes forming the gate insulation film on a part of the first substrate including the sealant formation region.

9. The method according to claim 8, wherein the gate insulation film and the passivation film on the sealant formation region are patterned to provide the dams and the furrow therebetween.

10. The method according to claim 9, wherein the dams and the furrow(s) are provided on regions in which the passivation film and the gate insulation film remain after the patterning of the passivation film and gate insulation film, and the furrow is provided on a region in which the passivation film and the gate insulation film are removed after the patterning of the passivation film and gate insulation film.

11. The method according to claim 9, wherein the dams are formed in a stacked layer of the gate insulation film and the passivation film.

12. The method according to claim 9, the passivation film has a contact hole exposing the drain electrode.

13. The method according to claim 12, wherein the passivation film and the gate insulation film in the sealant formation region are patterned during the patterning of the passivation film to provide the contact hole.

14. The method according to claim 9, wherein the sealant formation region is provided in the boundary portion between the active and non-active areas.

15. The method according to claim 9, wherein the sealant is dispensed in a part of the sealant formation region adjacent to the active area.

16. The method according to claim 9, wherein the dams and the furrow(s) are formed in a part of the sealant formation region adjacent to the non-active area.

17. The method according to claim 9, wherein the first and second substrates each includes a flexible material.

18. The method according to claim 7, wherein the dams and the furrow(s) are provided on regions in which the passivation film remains after the patterning of the passivation film, and the furrow is provided on a region in which the passivation film is removed after the patterning of the passivation film.

19. The method according to claim 7, wherein the dams are formed in a single layer of the passivation film.

* * * * *